Figure 1:
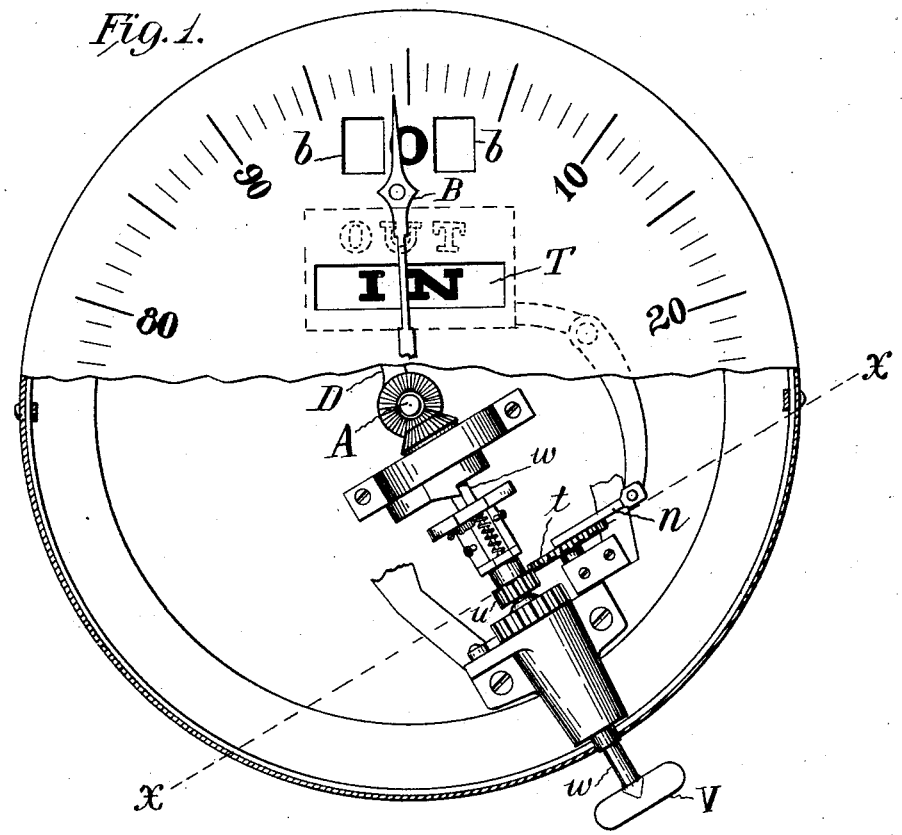

No. 723,377. PATENTED MAR. 24, 1903.
J. W. FOWLER.
FARE REGISTER.
APPLICATION FILED MAR. 17, 1902.
NO MODEL. 3 SHEETS—SHEET 1.

Witnesses
Edgeworth Greene
Earle H. Smith

John W. Fowler
Inventor
By his Attorney

No. 723,377. PATENTED MAR. 24, 1903.
J. W. FOWLER.
FARE REGISTER.
APPLICATION FILED MAR. 17, 1902.
NO MODEL. 3 SHEETS—SHEET 2.
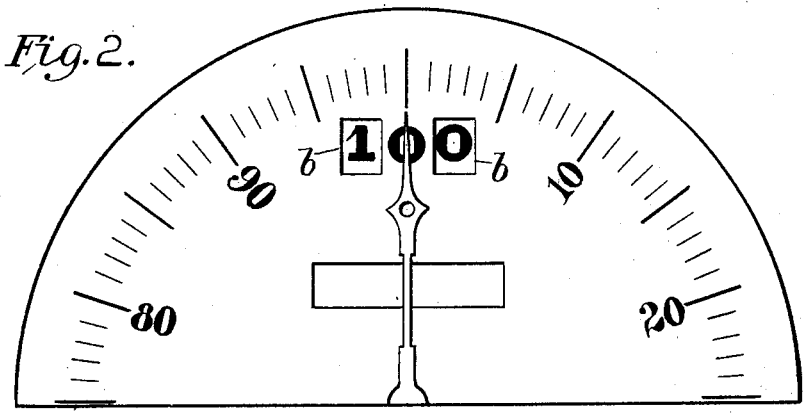
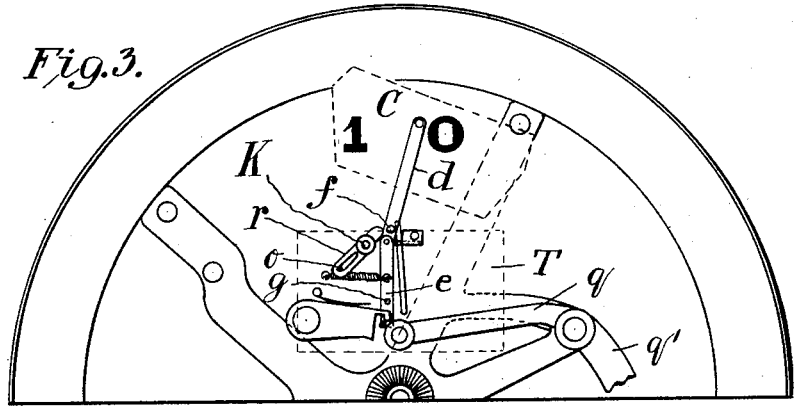
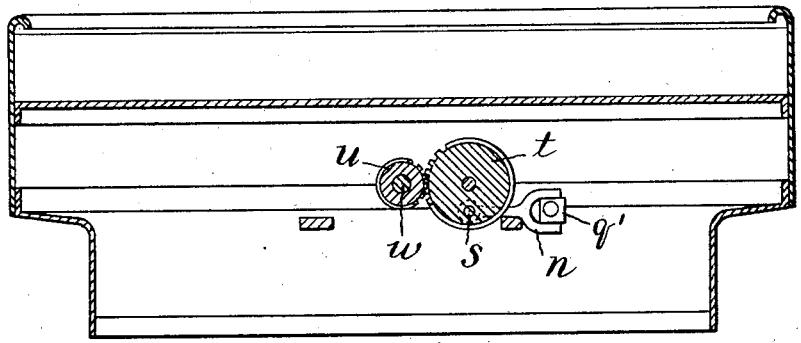

No. 723,377. PATENTED MAR. 24, 1903.
J. W. FOWLER.
FARE REGISTER.
APPLICATION FILED MAR. 17, 1902.
NO MODEL. 3 SHEETS—SHEET 3.
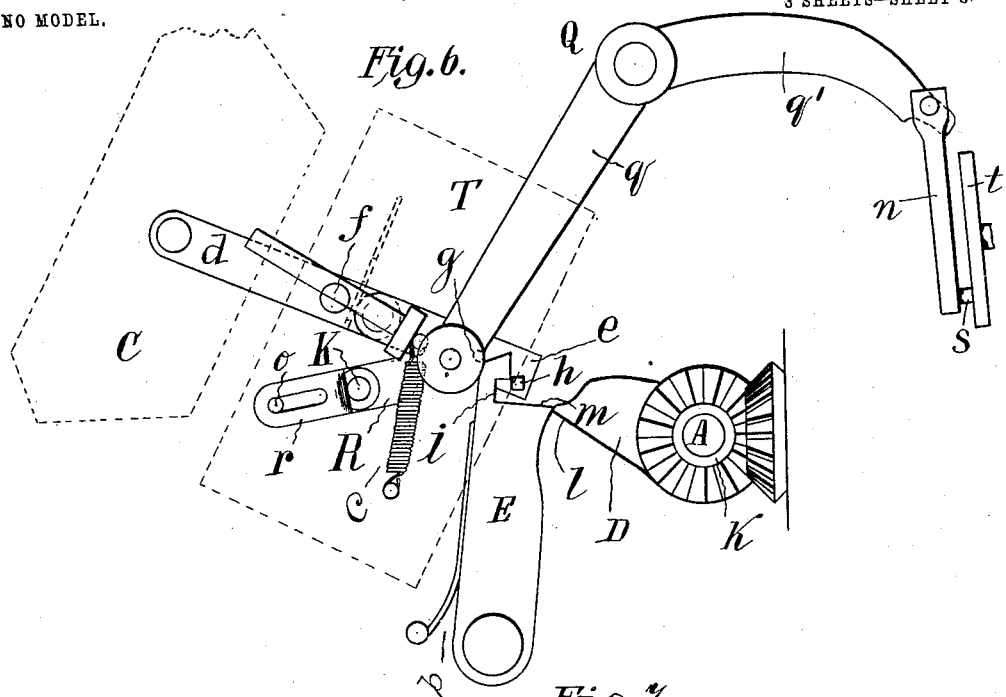
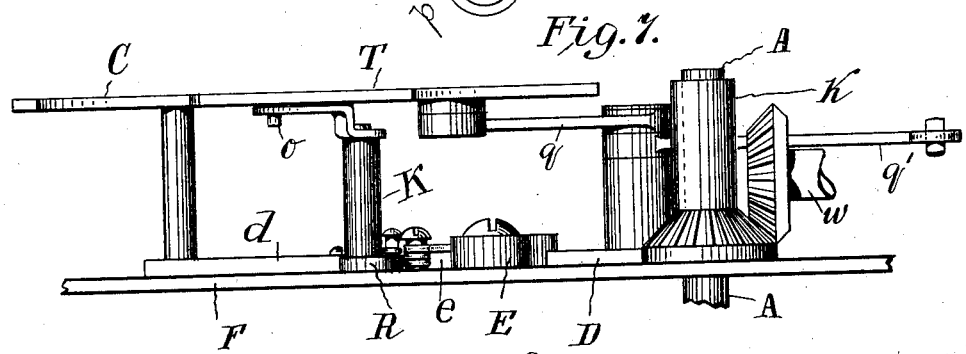
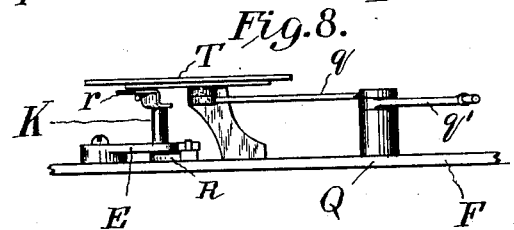

UNITED STATES PATENT OFFICE.

JOHN W. FOWLER, OF BROOKLYN, NEW YORK.

FARE-REGISTER.

SPECIFICATION forming part of Letters Patent No. 723,377, dated March 24, 1903.

Application filed March 17, 1902. Serial No. 98,517. (No model.)

*To all whom it may concern:*

Be it known that I, JOHN W. FOWLER, a citizen of the United States, residing at Brooklyn, in the county of Kings and State of New York, have invented certain new and useful Improvements in Fare-Registers, of which the following is a specification.

This invention relates to dial passenger-registers wherein the number of fares taken and registered is indicated by a revolving pointer called a "trip-hand" on a dial of a diameter sufficient to plainly indicate one hundred fares in one complete rotation of the pointer. These dial-registers are usually limited to one hundred fares, that number being found in practice sufficient to cover all fares ordinarily collected in one half-trip—*i. e.*, without returning—the machine being then reset, and also to keep the size of the apparatus within practical limits. It is found, however, that with the increase in carrying capacity of modern cars registers are often required to count more than one hundred fares in one half-trip; and it is the principal object of this invention to enable the ordinary trip-register to count one hundred and ninety-nine fares without any material change of the present apparatus or multiplying of the gearing therein.

For these purposes my invention consists of a dial-plate having numerals thereon and an aperture or apertures therein near the zero-mark, a plate bearing a numeral or numerals disposed behind the dial and adapted to show through the aperture or apertures when the trip-hand has completed one revolution upon the dial, a swinging lever carrying the numeral-plate, a friction-sleeve carrying the trip-hand provided with a finger having a cam projection, and means intermediate of such projection and the numeral-plate lever to cause the numeral-plate to show through the aperture or apertures when the trip-hand has completed one revolution upon the dial.

My invention further consists in the construction and combination of other devices, the features of novelty of which are set forth in the appended claims, and it is understood that forms and minor details may be variously modified within the invention.

The register mechanism will comprise a counter for indicating sums or totals above five hundred and means for ringing a gong as each fare is collected and many other minor details common to this class of passenger-registers, which it is unnecessary to describe, being well known, but forming no part of this invention.

It is to be understood that the mechanism for indicating the ninety-nine or less additional fares will in practice only be brought into use occasionally as circumstances necessitate—for example, when some particular event causes a rush—at other times simply remaining inert.

Provision for indicating one hundred fares registered in numerals may be made in various ways within the invention.

In the machine here shown two apertures $b\ b$ are made in the dial-plate, one on each side of the zero ("0") mark, and a plate C, called a "numeral-plate," having printed thereon the ordinals "1" and "10," respectively, is so arranged behind the dial that when said ordinals are brought into view through said apertures on each side of the zero-cipher the three figures together read "100," as seen in Fig. 2, and such plate also has blank spaces which close the apertures when the "100" indication is retired from view or "blanked."

The means for causing the special indication to show figures or change to blank as and when required can be of any character desired and may be operated by hand. It is, however, a feature of this invention that such change shall be made by mechanism operated from without the case containing the machine and automatically. The exposure of the "100" sign being made by the act of operating the machine to count or register the fares and the change to blank accomplished by the act of resetting the trip-hand back to zero to begin another count, these operations are thus placed beyond control of the conductor or other fare-taker who operates the machine to register the fares collected.

To enable others skilled in the art to construct and operate my invention, I will proceed to describe the same in connection with the annexed drawings, wherein I have shown so much of a dial fare-register of the type known to the trade as the "Alarm" or "Fowler & Lewis" as necessary to illustrate my invention.

Figure 4:
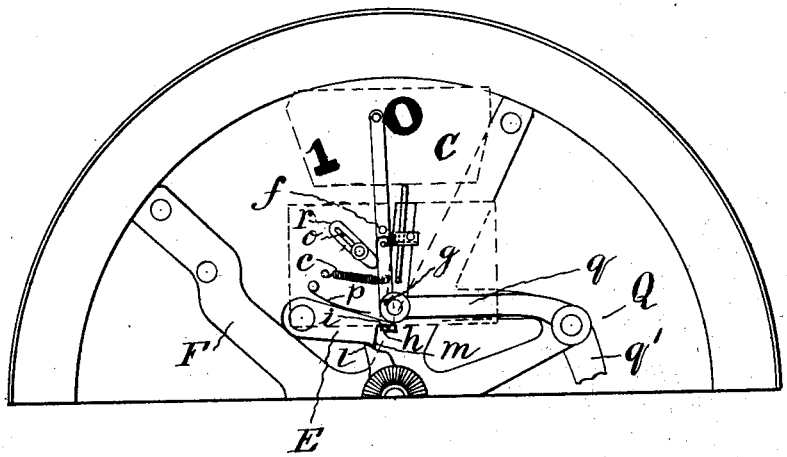

In said drawings, Figure 1 is a face view of the apparatus, showing in the lower half the resetting mechanism and showing in the upper half part of a dial containing apertures exposing special figures indicating a total of one hundred fares, also the aperture through which is exhibited the ordinary trip-signal, as "Out" or "In." Fig. 2 shows a like part of dial-plate in which the special figures indicating one hundred fares registered show through their apertures. Fig. 3 shows the mechanism immediately beneath the dial in the position the parts assume when the special figures on the numeral-plate are in view, the numeral-plate being indicated in dotted lines, and also showing the upper portion of the bell-crank lever, part of the resetting mechanism. Fig. 4 represents the same parts in the position they occupy when the numeral-plate shows blank, as in Fig. 1. Fig. 5 is a cross-section taken through X X, Fig. 1. Fig. 6 is a plan view of the trip signal-plate mechanism, enlarged. Fig. 7 is a side elevation of the trip-signal mechanism of Fig. 6 as seen from below. Fig. 8 is an elevation of the mechanism of Fig. 3 as seen from below.

The "100" sign or numeral-plate $c$ is fixed to the outer end of an arm or lever $d$, forming the upper section of the double lever $d\,e$, the inner extremities of which sections are hinged by a toggle or rule joint connection, presenting an even contour at the junction. The section $d$ is fulcrumed to the frame F of the machine at $f$, and the section $e$ is fulcrumed in like manner at $g$ and the two sections are normally in right lines with each other and are held locked in this condition by a pivoted bar E, on which is held a spring $p$, tending to force the bar down. It has a notch $i$, adapted to hook over a square stud $h$, set in section $e$ below its fulcrum $g$. A small spring $c$ tends to draw the arm $e$ over to the left and cause the toggle-lever to assume a bent condition and throw out a knee in the path of a wiper R, to be described.

The central shaft A of the machine has a friction-sleeve $k$ thereon, to which the trip-hand B is made fast. The said shaft A is rotated with a step-by-step progression through means of a ratchet mechanism (not shown) common to fare-registers, the trip-hand counting one fare at every step.

The trip-hand sleeve $k$ carries a finger D, made fast thereto and traveling therewith. This finger is so placed with reference to the trip-hand that when the latter has advanced and counted ninety-nine fares a protuberance $l$ at the extremity of the finger has reached a cam-point $m$, formed on the swinging bar E, as seen in Fig. 4. At the advance of the trip-hand one step farther and to zero the finger D passes under the cam-point $m$ on the bar E, raising the bar and unhooking its notch from the stud $h$ in the toggle-lever $d\,e$, when the latter immediately takes the bent or knee form, throwing the upper end of section $d$ and the numeral-plate thereon over to the right and bringing into view the ordinals reading "100," in which position it remains during the advance of the trip-hand in its second round over the dial, which then reads, "110," "120," &c., up to "199," if so many fares are counted. Meantime the hooked end of bar E rests with spring force on the upper side of stud $h$ in readiness to engage and lock the toggle-lever in the straightened condition it assumes when the "100" indication is rendered blank, as in Fig. 1.

At the termination of any half-trip "in" or "out," in which the "100" sign has been used, when the trip-hand is turned back or reset to zero the mechanism for changing the numeral-plate to blank, as in Fig. 1, requires to be in readiness for such change. Such numeral-plate may be operated for this purpose in any convenient manner. For instance, $q$ represents one arm of a bell-crank lever Q, which is connected by a pitman $n$ from the other arm $q'$ to a crank-pin $s$, set in a wheel $t$, by which crank and pitman the arm $q$ is moved up and down, the wheel $t$ being geared to a pinion $u$, made fast to a shaft $w$, extending to the outside of the register-case, from whence it is operated by a knob V, the arm $q$ having a suitable extension reaching to and operating the wiper R for acting on the knee of the toggle to straighten out the same in masking the "100" indication. However, as before said, it is a feature of this invention that such operation should be accomplished automatically and in connection with the resetting of the trip-hand to zero. The lever Q is practically the same in form and movement with that employed in this class of fare-registers, in connection with the resetting mechanism to actuate the trip-signal for indicating the "out" or "in" trip, the trip-signal being always changed in such mechanism in the operation of resetting the trip-hand to zero, the resetting mechanism being operated from without the machine-case by a knob or otherwise in the usual manner. In all registers, therefore, to which my improvement is applied, where such trip-signal is found, I prefer to utilize the same for changing the numeral-plate to blank.

The resetting mechanism shown in the drawings is well known, being shown in Patents Nos. 271,977 and 273,675 and other patents on the "Alarm" register, which may be referred to for a fuller description and need not be again detailed here.

In the present instance T, the trip-signal plate carried by the arm $q$, serves for the said extension of arm $q$. Such plate T carries a pin $o$, fixed therein, which engages a slotted arm $r$, made fast to the upper end of a rock-shaft K, to the lower end of which the wiper R is affixed. The axis of this shaft is set opposite the knee-joint of the toggle-lever $d\,e$. The up-and-down motion of the arm $q$ of lever Q operates by the pin o and the slotted lever to oscillate the rock-shaft and swing the wiper R up or down, as the case may be, to pass and repass the joint of the toggle-lever. At the end of any half-trip "out" or "in" if the arm q be found in the upper position the wiper R will point downward, as seen in Fig. 4, and vice versa. In either case if during the trip just completed the "100" sign has been brought into use the toggle-lever d e will have taken the knee form, and in the change of the trip-signal the plate T will operate the wiper R to straighten up the toggle-lever, the effect being to throw the numeral-plate to the left and the "100" sign to blank, so to remain until called into requisition again in the manner first before described.

I claim as my invention—

1. In a dial passenger-register, the combination with the dial provided with apertures near the zero-mark, a plate bearing numerals arranged behind the dial adapted to show through the apertures, announcing one hundred fares registered, a swinging lever carrying such numeral-plate, and the revolving trip-hand pointer, of the friction-sleeve carrying the trip-hand, provided with a finger having a cam projection thereon, and means intermediate of such cam-finger, and numeral-plate lever, for operating the numeral-plate to show its "100" sign when the trip-hand points to the zero-mark.

2. In combination with the numeral-plate bearing the "100" sign, a swinging arm carrying such plate and forming one section of a toggle-lever whose two sections are adapted to take a bent form when the "100" sign is brought into view, means of setting such two sections in right lines with each other when the "100" sign is blanked, a stud set in the lower section of such toggle, and a locking-bar having a notch thereon which engages such stud and locks the sections of the toggle-lever normally in right lines with each other when the numeral-plate shows blank.

3. The combination with the trip-hand sleeve provided with a cam-finger, the numeral-plate bearing the "100" sign, a swinging arm carrying such plate, a spring adapted to cause such arm to bring the "100" sign into view, such arm forming one section of a toggle-lever provided with a stud as h, and a locking-bar for engaging such stud and holding the "100" sign in blank, such locking-bar having a cam projection acted on by the trip-hand finger to disengage such bar from the toggle-lever and release the swinging arm d when the "100" sign thereon is to be brought into view.

4. The combination, for changing the numeral-plate to the blank position, of the toggle-lever comprising the arm d carrying such plate, a rock-shaft located opposite the knee-joint of such toggle, the bell-crank lever Q in gear with the resetting apparatus, the arm, having an extension T, carrying a pin, oscillating the rock-shaft by a slotted arm at the upper end, such shaft at the lower end carrying a wiper R adapted to contact with the knee of the toggle when the "100" sign is in sight, and by such contact swinging the arm d, to throw the "100" sign into blank, at any movement of the bell-crank Q either up or down, in connection with the operation of resetting the trip-hand to zero.

JOHN W. FOWLER.

Witnesses:
EARLE H. SMITH,
G. N. KISSARN.